UNITED STATES PATENT OFFICE.

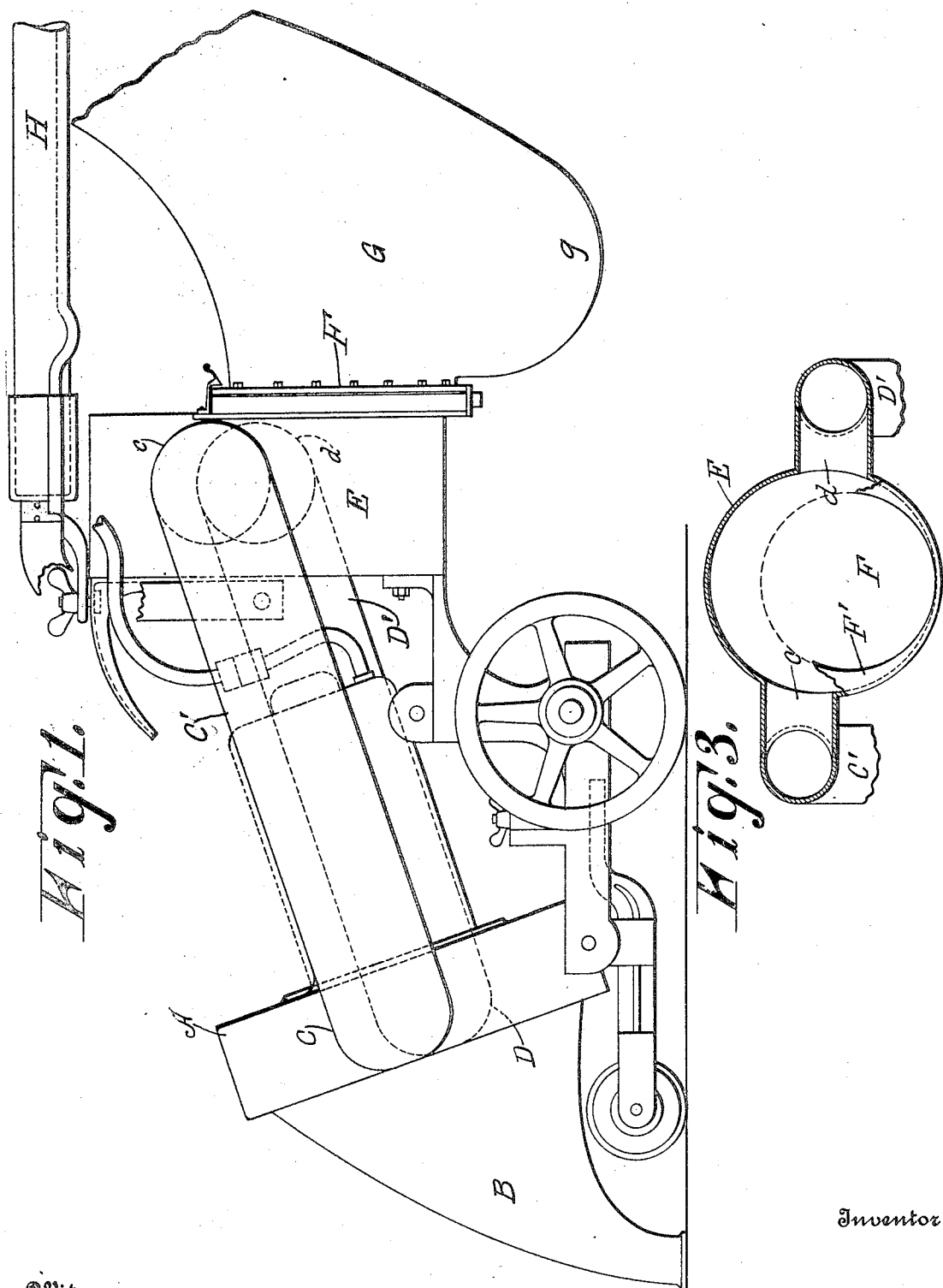

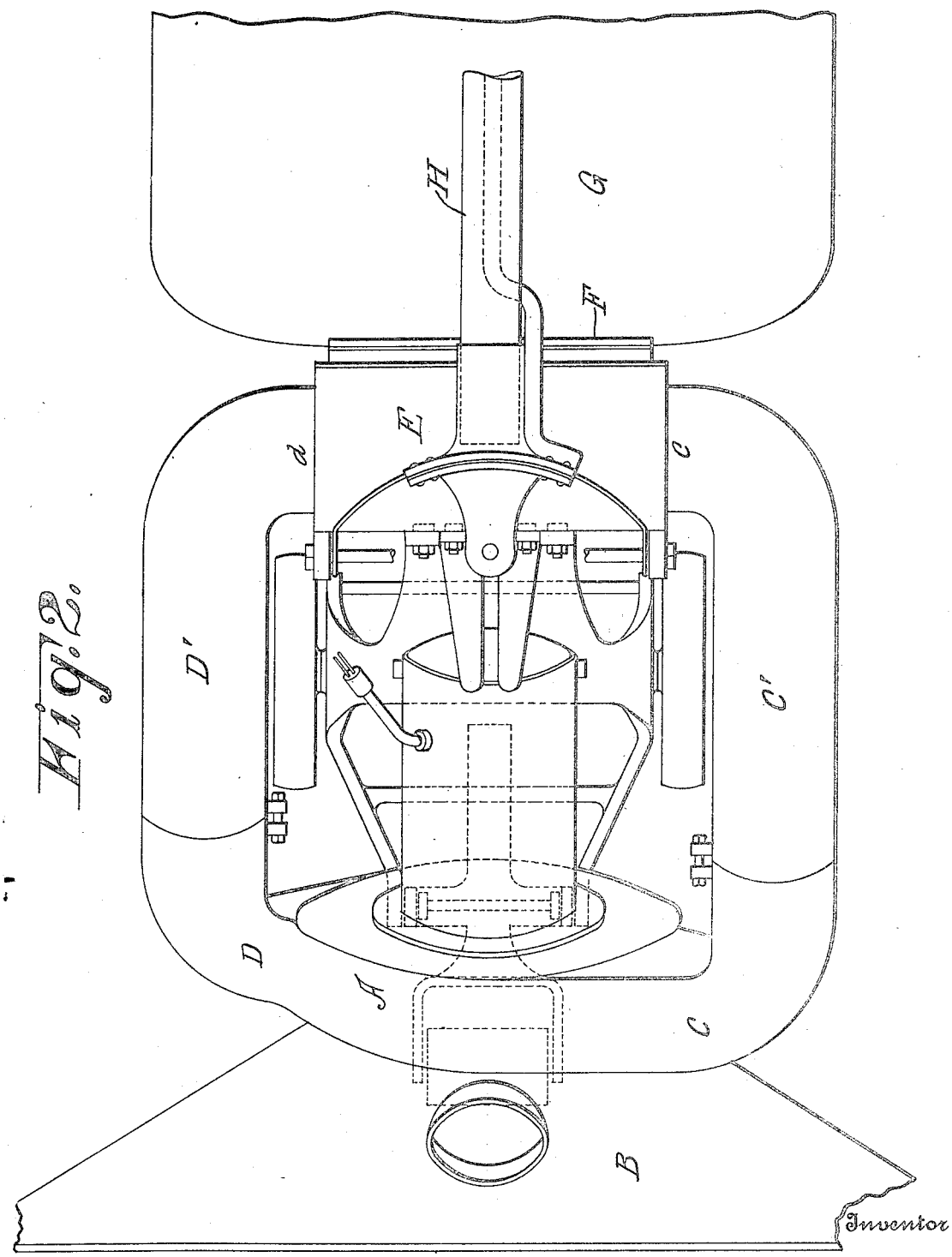

JEFFREY J. POWER, OF MADISON, WISCONSIN, ASSIGNOR TO POWER-STEVENS FAN DEVICES COMPANY, OF MADISON, WISCONSIN, A CORPORATION OF WISCONSIN.

VACUUM-CLEANER.

1,317,457.

Specification of Letters Patent.   Patented Sept. 30, 1919.

Application filed February 25, 1916. Serial No. 80,341.

*To all whom it may concern:*

Be it known that I, JEFFREY J. POWER, a citizen of the United States, residing at Madison, county of Dane, and State of Wisconsin, have invented new and useful Improvements in Vacuum-Cleaners, of which the following is a specification.

My invention relates to improvements in vacuum cleaners.

It has been common practice to deliver the air and dust drawn by suction through the cleaning nozzle into a filtering chamber where the dust is allowed to settle and the air permitted to escape through the walls of the chamber to the exterior, but chamber walls which are sufficiently porous to serve the purpose of filtering walls become rapidly clogged with dust, and when clogged, they obstruct the passage of air to such an extent as to materially reduce the efficiency of the machine by developing back pressure upon the fan or pump. Experiments which I have made have demonstrated that the clogging of the filtering walls is largely due to the fact that the dust is carried forcibly against the walls by the air currents and is forced into the pores or interstices by the rapidly moving air, whereas if the velocity of the air current is reduced to a minimum and the air current broken up or practically destroyed, the dust will settle much more rapidly to the bottom of the filtering chamber or sack and the particles of dust which reach the side walls or top of the chamber will not be forced into the pores, but will lodge loosely upon the inner surface and can be readily shaken from it and caused to drop, particularly where a flexible fibrous wall is employed for filtering purposes.

The object of my invention is therefore to provide means for thoroughly breaking up the air current or currents from a fan or pump and reducing the movement of the air through the filtering chamber of a vacuum cleaner to a minimum. Also to provide means whereby, in breaking up the main air current, it is subdivided into a large number of small eddy currents which have no specific direction of travel, which tend to eliminate the dust by centrifugal force and which are constantly dissipating their energy by interference with each other.

In the drawings—

Figure 1 is a side elevation of a vacuum cleaner embodying my invention with a portion of the separating sack and drum broken away to show the interior.

Fig. 2 is a plan view of the same.

Fig. 3 is a transverse sectional view of the buffer drum in which the air currents are broken up.

Like parts are identified by the same reference characters through the several views.

The air pump A, illustrated in the drawings, may be of any ordinary construction, but preferably comprises a suction fan of the same general type shown and described in Letters Patent, No. 1033929, dated July 30, 1912. The suction nozzle B may also be of any ordinary construction adapted to deliver air to the fan A. The air and dust drawn into the fan casing through the suction nozzle B are delivered through a plurality of outlet ducts C and D which lead to a buffer chamber, preferably having the form of a drum E. The ducts have elbowed portions C', D', which are arranged to discharge through ports $c$, $d$, in the periphery of the drum. The ports $c$ and $d$ are located on opposite sides of the drum, and about one half of each port is located diametrically opposite the other, the arrangement being such that the air blast from one port will, in part, be directly opposed to a portion of the air blast entering the other port, whereby each will tend to neutralize the force of the other. The meeting portions of the air blasts will, of course, intermingle and be deflected across the paths of the remaining portions of the blasts which are not directly opposed, and will not only split up and destroy their force to a large extent, but will produce a multitude of eddy currents each of which tends to discard the dust by centrifugal force, developed in the eddies. The air is thrown toward the periphery of the drum on each side of the paths of the entering currents and the opposing currents are so split up and reduced in force, that they are deflected in all directions and their remaining kinetic energy largely absorbed in the eddies.

The drum is provided with a large circular opening F in its rear wall, and the air escapes through this opening, into a filtering sack G. Owing to the fact that the air ports are located with their axes in a line parallel to the sides of the drum, and deliver the air directly toward the central portion of the drum, it is obvious that the tendency will be for the air to be thrown toward the periphery to a much greater extent than toward the sides. Most of the air will therefore escape through the opening F near its margins, and a large portion of the dust will be discarded by the eddies immediately and permitted to drop into the receiving pocket $g$, which also receives the heavier particles or materials which are carried with the air blasts before they were split up and their force destroyed as above described.

The contact of the eddies with each other, and with the walls of the drum before their escape therefrom, will of course, also tend to still further break up and destroy their energy, and as they enter the sack without specific direction, and with light force, it is obvious that the dust will not be driven forcibly against the wall of the sack at any point. The particles thrown off by the eddy currents settle by gravity to the bottom portion of the sack, and owing to the lack of velocity in the eddies or in the air between them, substantially all of the dust will be permitted to settle to the bottom portion of the sack before the air reaches the other portions of the sack wall. The extremely light portions of dust remaining simply lodge loosely upon the fabric composing such walls and a slight vibration of the walls causes these particles to drop away from the walls to the bottom of the receptacle.

The separating or filtering chamber preferably comprises the sack G, secured to the drum at the margins of the aperture F and extending upwardly and rearwardly from the initial receiving portion above the pocket $g$. The sack is supported from a lever or handle bar H. The drum opening F is preferably eccentric to the axis of the drum, its center being a little below the drum axis as shown, and the general drift of the air delivered from the drum is therefore in a downward direction, for the air escaping from behind the flange F' will of course move downwardly.

In the construction illustrated, the port $c$ has its axis sufficiently above a horizontal line cutting the drum axis and the port $d$ has its axis sufficiently below said line to directly oppose only one half of the air current from either port to the air entering from the other port, the delivery through both ports being horizontal. The degree of direct opposition in the ports and currents is not essential, but I have found that better results can thus be secured, than by having all of each air current projected directly into the other. The resulting eddies and the clearance of the air from in front of the ports is much more effective where the axes of the respective ports $c$ and $d$ are partially offset. In the construction illustrated, an aspirating effect is secured in the central portion of the drum and little or no air passes into the sack through the central portion of the opening F. In fact, I have observed a tendency for air to enter the drum from the sack at the center of this opening F, while at the margins of the opening, bits of yarn secured to the drum walls are projected outwardly into the sack and rapidly twisted by the eddy currents above described. The air is concentrated in the eddies and projected into the sack near the margin of the opening F, and its forward movement is very rapidly diminished by friction with the air in the sack, and by the counter movement of air from adjacent eddies.

In operation, air and dust is drawn through the suction nozzle B into the fan casing A, and is discharged therefrom through the pipes C and D, and their extensions C' and D', and delivered into the buffer chamber through the ports $c$ and $d$, formed in the peripheral walls thereof. The air enters through the ports C at a higher level than through the ports D. But in general, air currents are directed through the central portion of the chamber, where they are partially opposed to each other, and in part tend to overlap, thereby causing the air to spread outwardly in a multitude of smaller currents which are deflected by the walls of the chamber, and turned backwardly upon each other, in such a manner as to break up the currents into a multitude of small eddies, with little momentum. The air then passes out of the buffer chamber through the opening F, with such little velocity that the dust readily settles into the lower portion $g$ of the sack.

I claim—

1. A vacuum cleaner including the combination with a suction pump and a filtering chamber, of a buffer chamber interposed between the pump and filtering chamber, and a plurality of ducts leading from the pump casing to the buffer chamber, and adapted to deliver air toward the central portion of said chamber from opposite sides thereof, said chamber having a generally cylindrical form, the ducts being arranged to deliver the air in partially overlapping and partially opposing currents, with the currents overlapping in planes at right angles to the axis of the cylinder, whereby the air is deflected against the curved peripheral walls of the cylinder, and each of the currents turned upon itself and broken up in a multitude of eddies, said buffer chamber having one flat side open to the filtering chamber, and being of sufficient capacity to allow the air to pass to the filtering chamber without resistance.

2. A vacuum cleaner including the combination with a suction pump and a dust separating chamber, of a buffer chamber interposed between the pump and said separating chamber, a plurality of ducts leading from the pump and discharging through the periphery of the buffer chamber to the interior thereof in such directions that the currents of air from said ducts move in part along lines within the buffer chamber which meet in the central portion, said buffer chamber having an opening in one side wall in communication with the separating chamber, of sufficient capacity to allow the air to escape without material velocity, said opening being eccentric to the axis of the buffer chamber and having its center below said axis.

3. Dust removing apparatus including the combination with a chamber having air filtering walls, of a buffer chamber having one side open to the filtering chamber, and provided with inlet passages adapted to admit air currents to the buffer chamber, along lines substantially parallel to the plane of its outlet to the filtering chamber, said inlet passages leading through opposite sides of the buffer chamber, in directions to cause the air currents to be partially opposed in the central portion of the chamber, and to partially overlap in planes parallel with the plane of the outlet, whereby the overlapping portions may be deflected against the closed walls of the chamber, and broken into a multitude of eddies by the outward movement or expansion of the air from the opposed portions of the currents, and by the walls of the chamber, and whereby the force of the incoming current may be reduced by the reversely moving air deflected from the chamber walls, the outlet of said chamber being of sufficient capacity to allow the air to escape to the filtering chamber without material resistance.

In testimony whereof I affix my signature in the presence of two witnesses.

JEFFREY J. POWER.

Witnesses:
 M. B. OLBRICH,
 H. P. JANISCH.